United States Patent [19]

Kobayashi et al.

[11] Patent Number: 4,944,874
[45] Date of Patent: Jul. 31, 1990

[54] CENTRIFUGAL SEPARATOR

[75] Inventors: Masaru Kobayashi, Shizuoka; Sumio Kawai, Shizuoka, both of Japan

[73] Assignee: Kabushiki Kaisha Okawara Seisakusho, Japan

[21] Appl. No.: 262,835

[22] Filed: Oct. 25, 1988

[30] Foreign Application Priority Data

Dec. 12, 1986 [JP] Japan .................................. 61-296406
Dec. 9, 1987 [JP] Japan .................................. 62-311775

[51] Int. Cl.⁵ .............................................. B01D 33/10
[52] U.S. Cl. ...................................... 210/232; 210/370; 210/380.1; 210/484; 210/489; 210/490; 210/497.01; 209/288; 209/379; 494/45
[58] Field of Search ................... 210/232, 360.1, 376, 210/369, 370, 380.1, 484, 485, 489, 490, 497.01, 498, 499; 494/45, 56; 127/19; 209/379, 288, 406, 410, 291

[56] References Cited

U.S. PATENT DOCUMENTS

| | | | |
|---|---|---|---|
| 3,438,500 | 4/1969 | Pico | 210/237 |
| 3,623,613 | 11/1971 | Quetsch | 210/370 |
| 3,630,379 | 12/1971 | Sharples | 210/369 |
| 4,193,874 | 3/1980 | Gerteis | 210/232 |
| 4,269,711 | 4/1981 | Gerteis | 210/370 |

Primary Examiner—W. Gary Jones
Assistant Examiner—Matthew O. Savage
Attorney, Agent, or Firm—Bruce L. Adams; Van C. Wilks

[57] ABSTRACT

A centrifugal filter separator includes a detachable tubular screen disposed between an annular filter and the inner peripheral surface of a basket, the screen having an annular flange detachably connected to an open end of the basket from the outside of the basket. The centrifugal separator having such detachable screen is applicalbe to centrifugal separation of various materials.

17 Claims, 6 Drawing Sheets

CENTRIFUGAL SEPARATOR

BACKGROUND OF THE INVENTION

1. Field of the Invention:

The present invention relates to centrifugal separators for separating a solids-and-liquid mixture into solids and a liquid by means of centrifugal force, and more particularly to such a centrifugal separator which is equipped with a filter on which solid components remain after removal of liquid components.

2. Description of the Prior Art:

An example of such centrifugal filter-type separator is disclosed in U.S. Pat. No. 4,193,874. The disclosed centrifugal separator, as shown here in FIG. 7 of the accompanying drawings, includes a drive unit A, a filtration unit B and a cake-discharge unit C. The drive unit A includes an outer shaft D drivable by a motor (not shown) and rotatably supported by a bearing E, and an inner shaft F fixedly secured by a key, for example, to the outer shaft D for corotation therewith. The filtration unit B includes a basket G secured to the outer shaft D, and a rotor H disposed inside the basket G and secured to the inner shaft F so that the basket G and the rotor H are rotatable concurrently with each other. The basket G has formed in its peripheral wall a number of perforations or pores G' for removing liquid components. The thus removed liquid components are collected to and then discharged from a discharge hole J in a casing I which contains the filtration unit B. The rotor H is slidably movable in a direction parallel to the axis of the basket G and includes a closure means for closing an open end of the basket G when the rotor H is received in the basket G. Extending between the basket G and the rotor H is a tubular or hollow cylindrical filter K formed of a woven fabric or the like. The filter K is overturned in response to the sliding movement of the rotor H in such a manner that the filter K is received in the basket G during filtration, and when a cake is discharged, the filter K is forced into the cake-discharge unit C while being turned upside down. The filter K is rotatable together with the basket G and the rotor H. The basket G is provided with a screen L of a corrugated cross section fixedly secured to an inner peripheral surface of the basket G for providing passageways for liquid components and also for preventing the filter K from being withdrawn into the discharge hole J.

In operation, the rotor H is received in the basket G, then while keeping this condition, a solids-and-liquid mixture to be separated is supplied into the filtration unit B through a feed pipe M which is disposed along the common axis of the rotor H and the basket G. The drive unit A is driven to rotate the basket G, the screen L, the filter K and the rotor H concurrently at high speeds, thereby removing liquid components from solid components by means of centrifugal force. In this instance, the liquid components are forced to flow successively through the filter K, the screen L and the pores G' in the basket G into the discharge hole J of the casing I. The solid components (cake) retain on the filter K placed inside the basket G. After removal of the liquid components, the rotor H is displaced from within the basket G to the cake-discharge unit C during which time the filter K is overturned, thereby removing the solid components from the filter K. The thus removed solid components is then discharged from a cake-discharge hole N.

The conventional centrifugal separator described above is however not fully satisfactory in that the firm attachment of the screen L to the basket G inhibits a free access to a space between the screen L and the basket G which is required for cleaning the space.

A further problem is that an improved effect to prevent withdrawal of the filter K into the screen L can only be attained by a double-layered screen L which is however complicated in construction.

SUMMARY OF THE INVENTION

With the foregoing difficulties in view, it is an object of the present invention to provide a centrifugal separator incorporating structural features which enables cleaning of the inside of a basket with utmost ease.

A further object of the present invention is to provide a centrifugal separator including a screen which is simple in construction and detachable from the basket.

According to the present invention, there is provided a centrifugal separator comprising: a rotatable centrifugal drum including a perforated basket having an open end, and a rotor slidably received in the basket and normally closing the open end of the basket, the rotor being rotatable in unison with the basket and reciprocally movable in a direction parallel to the axis of rotation of the drum into and out of the drum through the open end of the latter; a flexible annular filter extending between the basket and the rotor and adapted to be overturned in response to the reciprocating movement of the rotor; a water permeable tubular screen disposed between the filter and an inner peripheral surface of the basket and having an annular flange at one end thereof detachably connected to the open end of the basket; and spacer means disposed on at least one of the screen and the basket for holding them in radially spaced relation to one another.

DETAILED DESCRIPTION

Certain preferred embodiments of the present invention will be described hereinbelow in greater detail with reference to the accompanying drawings.

Figure 1:
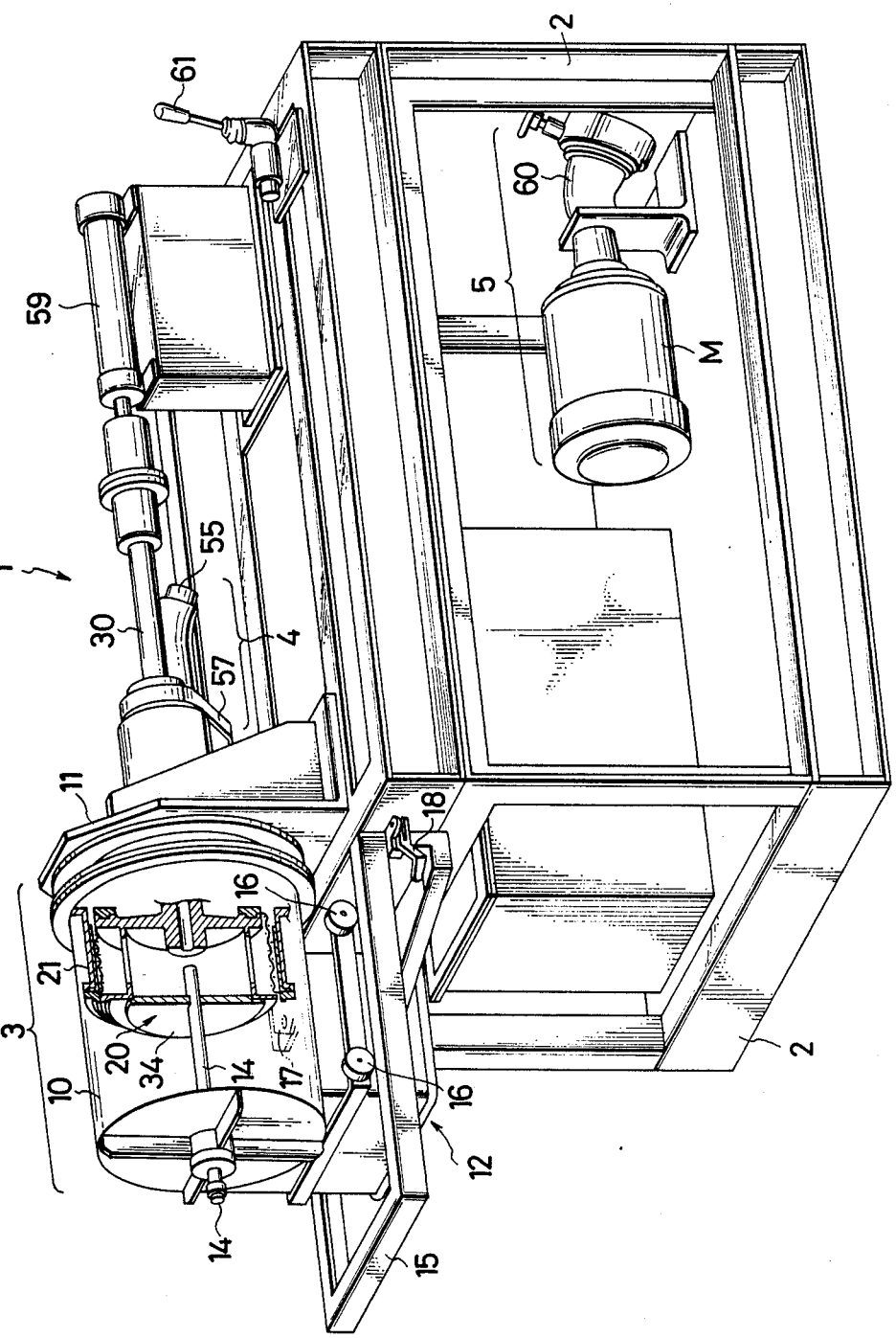
FIG. 1 is a perspective view of a centrifugal separator according to the present invention.

FIG. 1 shows a centrifugal separator 1 embodying the present invention. The centrifugal separator 1 includes a substantially rectangular frame 2 supporting thereon a processing head 3 for achieving a centrifugal separation, a drive shaft unit 4 for driving the processing head 3, and a hydraulic power unit 5 for supplying a power to the processing head 3 and the drive shaft unit 4.

The processing head 3 includes a casing 10 constituting an outer shell of the processing head 3. The casing 10 has a tubular shape and is mounted at its one end to a head bracket 11 secured to an upper horizontal base of the frame 2. The other end or the front end of the tubular casing 10 is closed. A feed pipe 14 is connected to a central portion of the forward end of the casing 10 and extends into the casing 10 along the longitudinal axis of the tubular casing 10 for supplying therethrough a material to be subjected to centrifugal separation. The casing 10 is carried on a set of four wheels 16, 16 (two being shown) disposed in pairs at a lower portion of the casing 10. The wheels 16 are rollingly movable along a pair of parallel spaced rails of a horizontal sub-frame 15 projecting forwardly from an end of the frame 2 so that the casing 10 is movable toward and away from the head bracket 11, thus enabling inspection of the inside of the processing head 3. The sub-frame 15 is angularly movable in a horizontal plane while carrying thereon the casing 10 because one of the rails is pivoted by a hinge 17 to an end of the frame 2. The sub-frame 15 is normally held in contact with the frame 2 by means of a clamp 18 disposed on the frame 2 and lockingly engageable with the other rail of the sub-frame 15. The casing 10 houses a centrifugal drum 20 in which a centrifugal separation is achieved.

Figure 2:
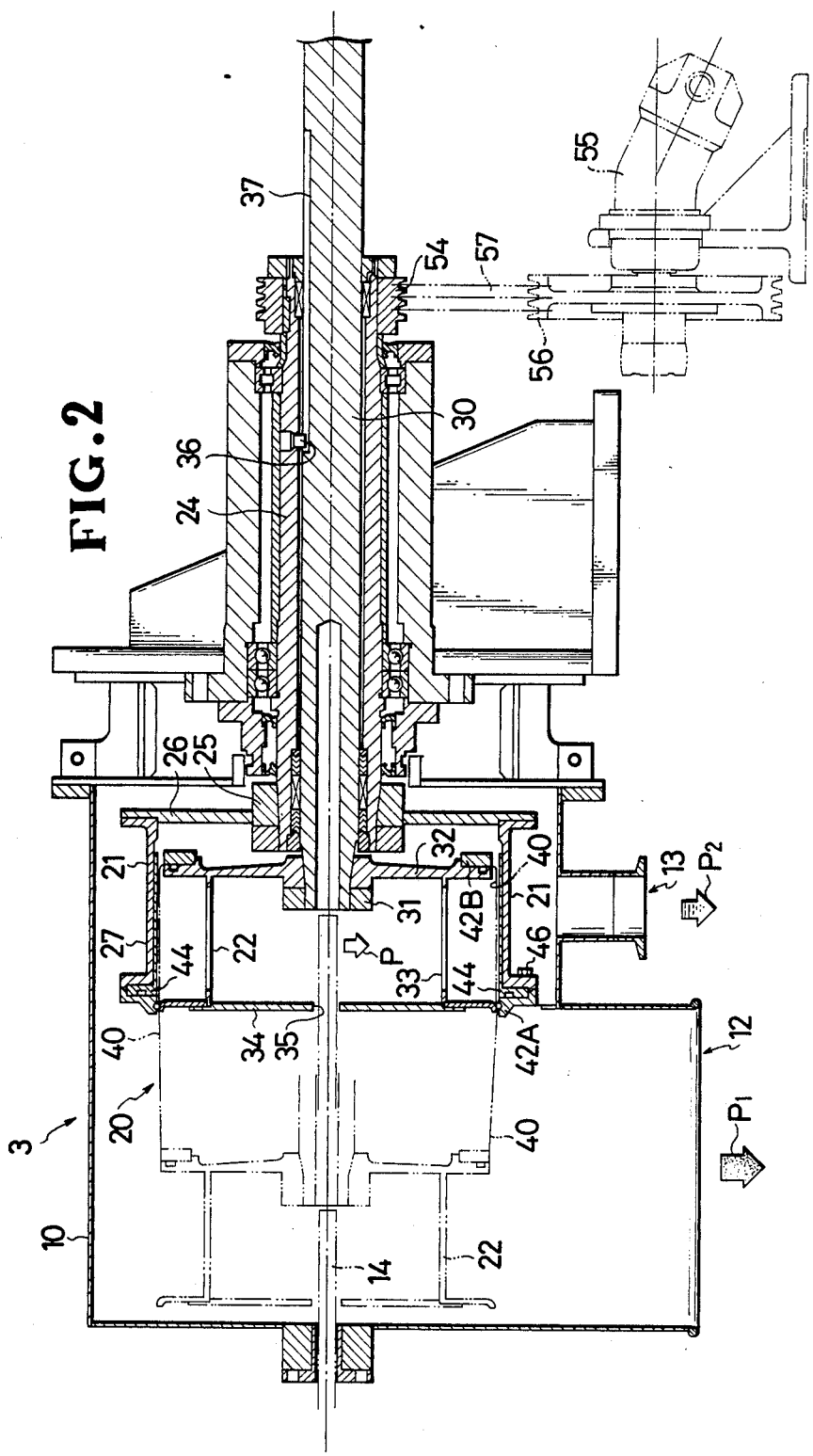
FIG. 2 is a longitudinal cross-sectional view of a processing head of the centrifugal separator.
Figure 3:
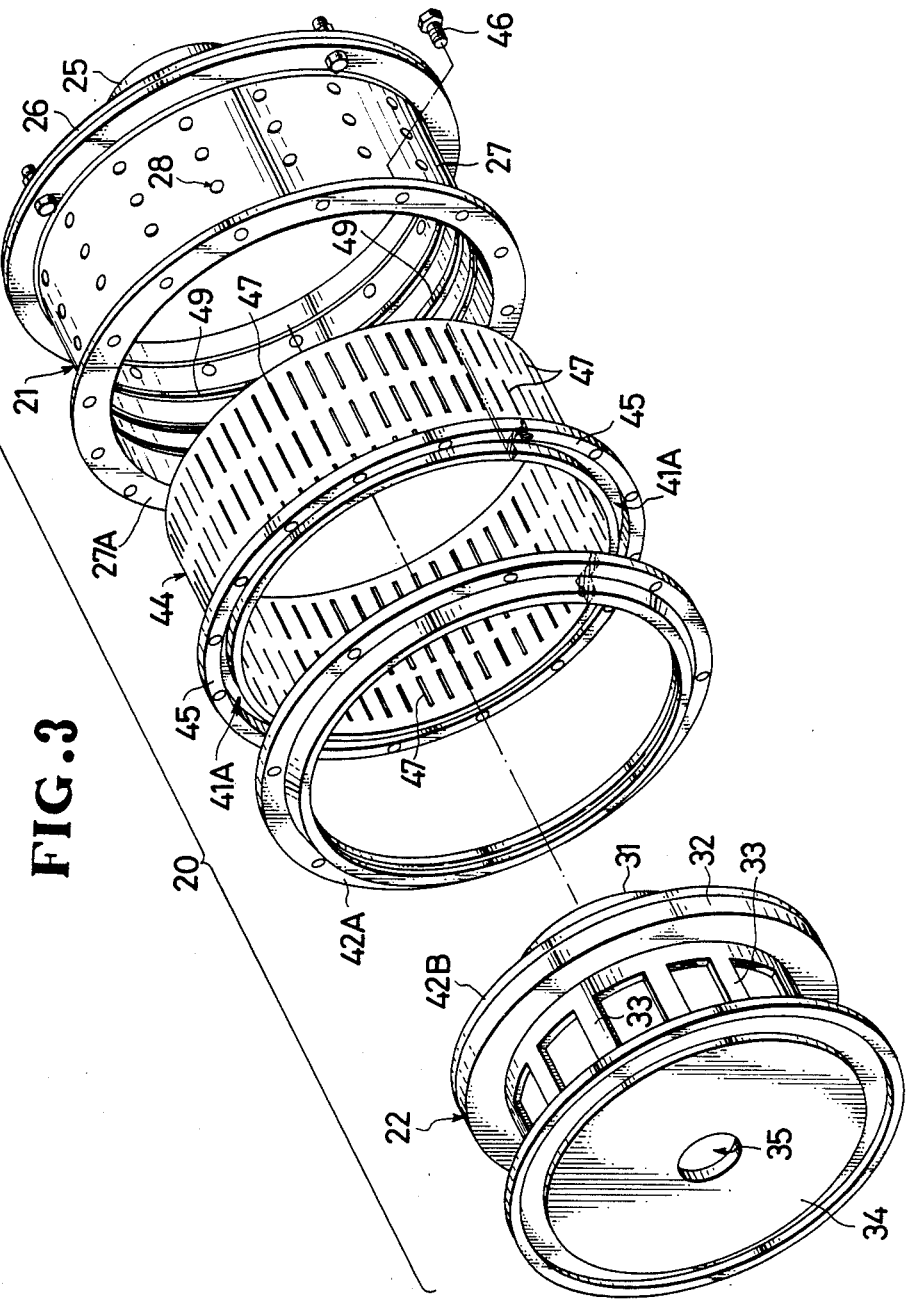
FIG. 3 is an exploded perspective view of a centrifugal drum of the processing head.

The centrifugal drum 20 generally comprises a basket 21 and a rotor 22 disposed inside the basket 21 and rotatable in unison with the basket 21, the rotor 22 being slidably movable into and out of the basket 21. The basket 21, as shown in FIGS. 2 and 3, includes a boss 25 firmly fitted to one end of an outer shaft 24, an annular flange-like end plate 26 extending integrally and radially outwardly from the boss 25, and a tubular peripheral portion 27 connected at its one end to an outer peripheral portion of the end plate 26. The basket 21 thus constructed has a generally cup-shape having an open end remote from the end plate 26. The tubular peripheral portion 27 has a number of perforations 28 (FIG. 3) through which liquid components P2 of the material P are discharged from the basket 21. The rotor 22 is rotatable within the basket 21 and movable between a first position in which the rotor 22 is fully received in the basket 21, and a second position in which the rotor 22 is disposed outside the basket 21. The rotor 22 includes a boss 31 firmly fitted to one end of an inner shaft 30 extending concentrically through the outer shaft 24, an annular end plate 32 formed integrally with the boss 31 and extending radially outwardly therefrom, an apertured tubular peripheral connector member 33 formed integral with the end plate 32 and extending perpendicularly from an outer peripheral portion of the end plate 32, and an annular cover plate 34 extending parallel to the end plate 32 to close a front end of the tubular connector member 33. The cover plate 34 is constructed in such a manner as to substantially close the open end of the basket 21 when the rotor 22 is disposed in its first position in which it is fully disposed within the basket 21 as indicated by solid lines in FIG. 2. The cover plate 34 has a central hole 35 for the passage therethrough of the feed pipe 14. The tubular connector member 33 has a number of elongate apertures or slots (not designated) circumferentially spaced at equal intervals.

The inner shaft 30 has in its central longitudinal portion an elongate keyway 37, while the outer shaft 24 has a key 36 slidably received in the keyway 27. With this interlocking engagement between the key 36 and the keyway 37, the inner shaft 30 is rotatable in unison with the outer shaft 24 and also slidable relative to the outer shaft 24.

Figure 4:
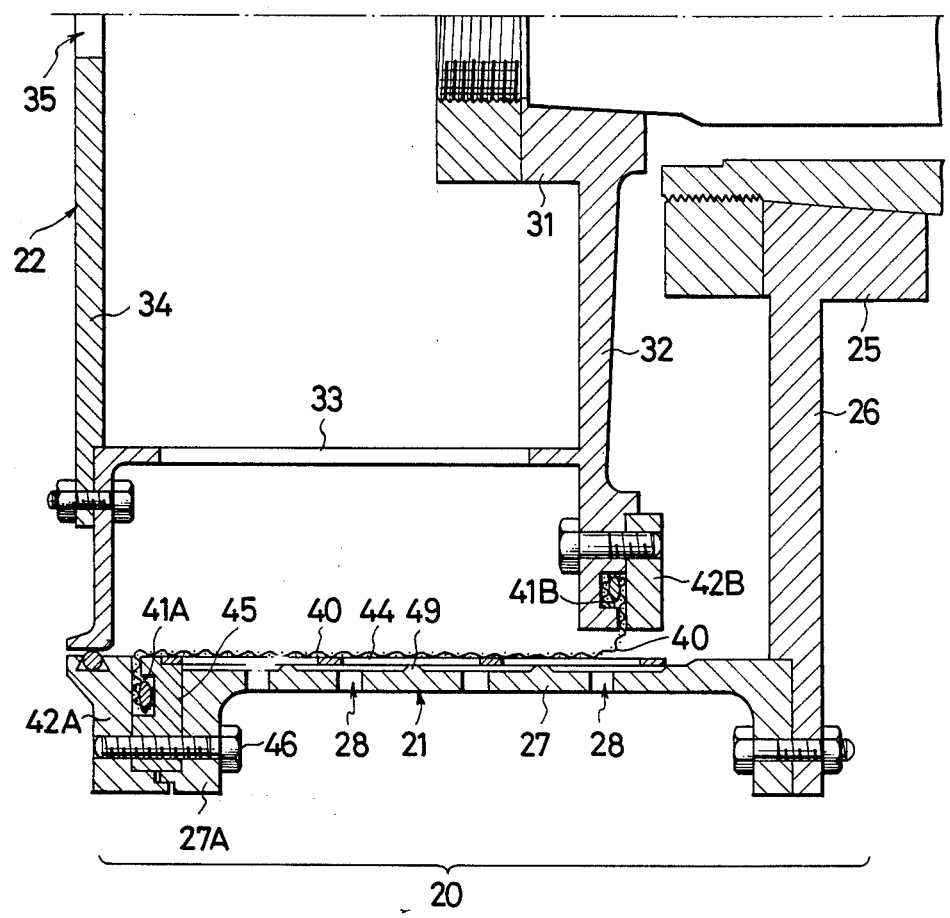
FIG. 4 is longitudinal cross-sectional view of a portion of the centrifugal drum.

The centrifugal drum 20 further includes a filter 40 of a woven fabric disposed between the basket 21 and the rotor 22 for filtrating liquid components P2 while blocking passage therethrough of solid components P1 of the material P. The filter 40 is secured at its opposite peripheral edges to the end plate 32 of the rotor 22 and to the open end of the basket 21. As shown in FIG. 4, the open end of the basket 21 has a circular groove 41A for receiving therein one peripheral edge of the filter 40. A presser ring plate 42A is secured by a plurality of screws 46 (only one shown) to the open end to firmly grip or hold the peripheral edge of the filter 40 on the open end of the basket 21. Likewise, the end plate 32 of the rotor 22 has a circular groove 41B for receiving therein the other peripheral edge of the filter 40. A presser ring plate 42B is secured by a plurality of screws (not designated and only one shown) to the end plate 32 to firmly hold the same peripheral edge of the filter 40 on the end plate 32 of the rotor 21.

According to an important feature of the present invention, there is provided a tubular screen 44 disposed between an inner peripheral surface of the basket 21 and the filter 40, the screen 44 having a water permeable structure.

As shown in FIGS. 3 and 4, the water permeable tubular screen 44 has a one-piece integral construction and a shape complementary in contour to the inner peripheral surface of the basket 21. The tubular screen 44 includes an end flange 45 secured to the open end of the basket 21. In this embodiment, the end flange 45 is disposed between the presser ring plate 42a and an annular flange 27A of the tubular peripheral portion 27 of the basket 21 and fastened to them by means of the screws 46. The circular groove 41A in the open end of the basket 21 is formed in one end face of the flange 45 of the screen 44 facing the ring plate 41A. The screen 44 has a number of openings 47 for the passage therethrough of the liquid components of the material to be separated. The openings 47 comprise three rows of axial slits circumferentially spaced at equal intervals. The slits 47 may be replaced with a number of circular holes of a small diameter. Alternatively, the slits may extend circumferentially along the peripheral wall of the screen 44 in either straight or zigzag formation. Yet, the screen 44 may be formed of a perforated plate bent into a tubular form.

The screen 44 is radially inwardly spaced apart from the basket 21 by a spacer means 49. The spacer means comprises a plurality of parallel spaced ribs 49 projecting from the inner peripheral wall of the basket 21. In the illustrated example, the ribs 49 extend circumferentially of the basket 21 but they may be arranged to extend parallel to the longitudinal axis of the basket 21. As an alternative, the ribs 49 may extend spirally along the inner peripheral wall of the basket 21. The ribs 49 may be continuous or interrupted into a series of rib segments. Yet, the ribs 49 may be provided on the screen 44 or on both of the basket 21 and the screen 44 provided that the ribs 49 do not hinder smooth fitting of the screen 44 into the basket 21.

Figure 5A:
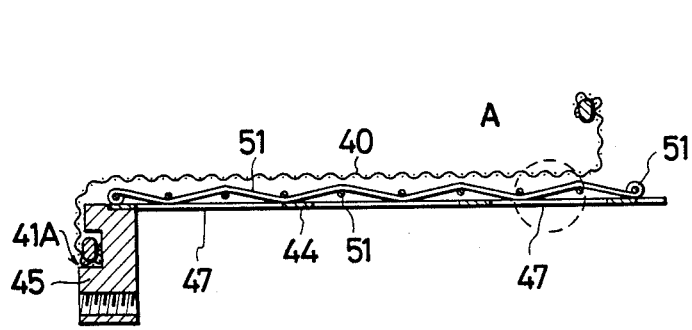
FIG. 5(a) is a view illustrative of a screen and a filter according to another embodiment.
Figure 5C:
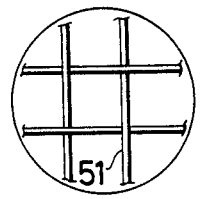
FIG. 5(c) is an enlarged plan view of the wire net in the area of circle A in FIG. 5(a)
Figure 5B:
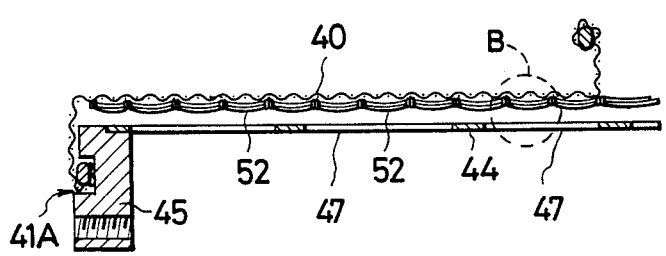
FIG. 5(b) is a view similar to FIG. 5(a), but showing a screen and a filter according to still another embodiment.
Figure 5D:
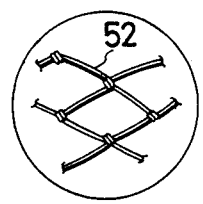
FIG. 5(d) is an enlarged plan view of the fabric net in the area of circle B in FIG. 5(b)
Figure 6:
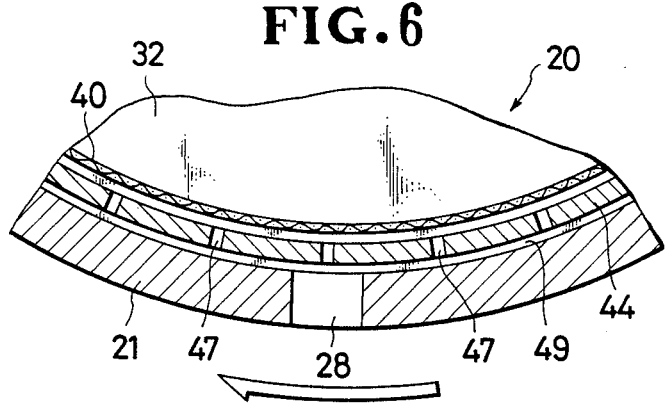
FIG. 6 is a transverse cross-sectional view of a portion of the centrifugal drum.
Figure 7:
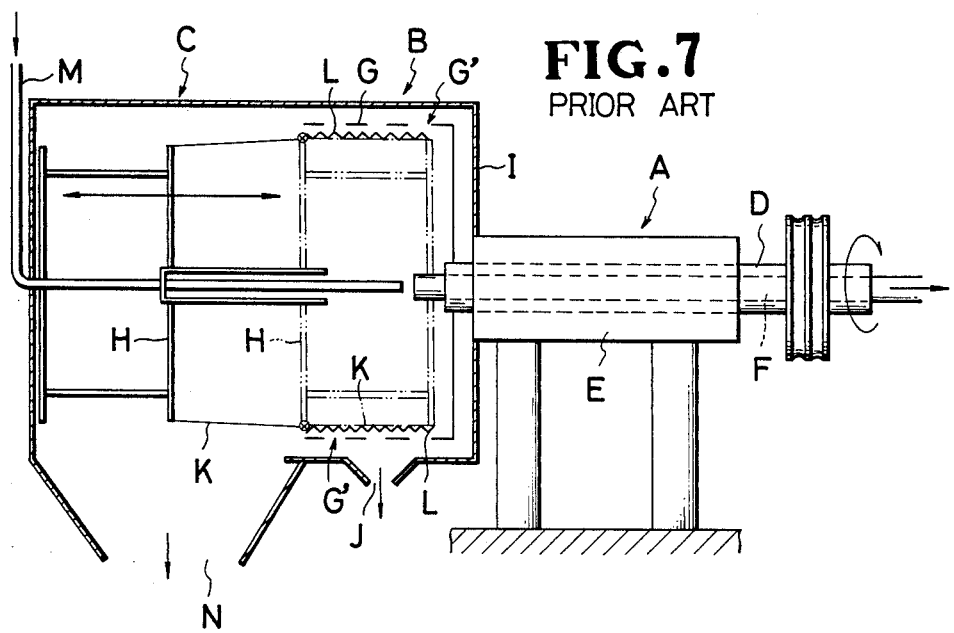
FIG. 7 is a diagrammatical view showing a conventional centrifugal separator.

As shown in FIG. 5(a), there may be provided a further spacer means 51 disposed between the screen 44 and the filter 40 for holding the filter 40 out of contact with the screen 44 to thereby provide a space therebetween, which space serves to promote filtration of the liquid components. The spacer means comprises a mesh or net 51 of woven wires, as shown in FIG. 5(c), disposed on the inner peripheral surface of the screen 44. The wire mesh 51 may be replaced by a flexible fiber net 52 united to one surface of the filter 40 facing the screen 44, as shown in FIGS. 5(b) and 5(d).

A description will be given of a drive system of the centrifugal separator 1 with reference to FIGS. 1 and 2. The drive system includes a driven pulley 54 (FIG. 2) secured to an intermediate portion of the outer shaft 24 and driven by an endless belt 57 trained around the driven pulley 54 and a drive pulley 56. The drive pulley 56 is secured to the drive shaft of a hydraulic motor 55. When the hydraulic motor 55 is driven to rotate the drive pulley 56, the outer shaft 24 and the inner shaft 30 keyed thereto are rotated concurrently. The inner shaft 30 is connected to a shift cylinder 59 (FIG. 1) at one end thereof remote from the rotor 22. In response to operation of the shift cylinder 59, the inner shaft 30 is longitudinally reciprocated along the outer shaft 24 to thereby move the rotor 22 into and out of the basket 21. The shift cylinder 59 and the hydraulic motor 55 are connected with the hydraulic power unit 5 to receive therefrom a pressurized working oil. The hydraulic power unit 5 includes a hydraulic pump 60 driven by an electric motor M. The operation of the shift cylinder 59 is controlled by a shift lever 61. In the centrifugal separator 1, various machine elements such as bearings, oil seals, etc. are disposed between rotatable component parts. These elements are conventional and do not constitute an essential part of the invention and hence will require no further description.

The centrifugal separator 1 of the foregoing construction operates as follows. The operation of the separator 1 begins with the rotor 22 disposed in its first position in which the rotor 22 is fully received in the basket 21. In this instance, the filter 40 is held taut between the open end 27A of the basket 21 and the end plate 32 of the rotor 22 and hence extends parallel to the screen 44. After a predetermined amount of material (a solids-and-liquid mixture) P is supplied through the feed pipe 14 into the centrifugal drum 20, the hydraulic motor 55 is driven to rotate the outer shaft 24, thereby revolving the basket 21 and the rotor 22 in unison with each other at high speeds. The solids-and-liquid mixture P held in the rotor 22 is subjected to centrifugal force whereby liquid components P2 of the mixture P are removed through the filter 40 to the outside of the rotor 22. The thus removed liquid components P2 are then forced to flow radially outwardly successively through the screen 44 and the perforations 28 in the basket 21 to the outside of the centrifugal drum 20 from which the liquid components P2 are discharged from a liquid-components discharge hole 13 defined in the casing 10 below the centrifugal drum 20. Conversely, solid components P1 of the mixture P remain on the inner peripheral surface of the filter 40. A centrifugal separation of the solid and liquid components P1, P2 is thus achieved. Thereafter, the shift cylinder 59 is actuated to extend its piston rod, thereby moving the rotor 22 forwardly from the first position to the second position in which the rotor 22 is disposed outside of the basket 21 as indicated by phantom lines in FIG. 2. With this movement of the rotor 22, the filter 40 is inverted or turned upside down (i.e., inside out) so that the solid components P1 carried on the inner peripheral surface of the filter 40 are removed from the filter 40 and then discharged from a solid-component discharge hole 12 defined in the casing 10. When the rotor 22 is disposed in the phantom-lined second position, a discharge end portion of the feed pipe 14 is received in a central axial hole in the inner shaft 30.

When it is desired to inspect the inside parts of the centrifugal drum 21, such as the filter 40, for example, the screws 46 are removed to detach the presser ring plate 42A from the open end of the basket 20, thereby releasing one end of the filter 40. Then, the presser ring plate 42B is detached from the end plate 32 of the rotor 20 in the same manner as done with the presser ring plate 42A, thereby releasing the other end of the filter 40. The filter 40 is thus removed from the centrifugal drum 20. With the detachment of the ring plate 42A, the flange 45 of the screen 44 is also released from locking engagement with the open end of the basket 21. Consequently, the screen 44 can be removed from the basket 21 by pulling the flange 45 forwardly away from the basket 21. The thus removed filter 40 and screen 44 are washed and then undergo inspection for damage. With the removal of the filter 40 and the screen 44, a cleaning of the inside of the basket 21 can be achieved with utmost ease.

As described above, the screen 44 is provided with an annular flange 45 by means of which the screen 44 can easily be releasably attached by fasteners to the basket 21 from the outside of the centrifugal drum 20. With this detachable screen 44, the inside of the basket 21 can be washed easily and sufficiently. The centrifugal separator 1 having such detachable screen 44 is particularly suitable for the manufacture of foodstuffs, medical products or the like in which provision of a clear processing fluid is a major requirement. A further advantage attainable by the detachable screen 44 is that different kinds of mixtures can be treated properly by replacing the current screen 44 with a different screen having a structure suitable for a mixture to be treated. Since the screen 44 is mounted on the basket 21 in radially spaced relation to the inner peripheral wall of the basket 21 by means of the ribs 49, the basket 21 is rotatable smoothly without causing objectionable vibration which may occur due to unbalance produced when the screen is welded to the inner peripheral surface of the basket 21. The screen 44 per se is simple in construction and can be manufactured at a low cost. The net 51, 52 disposed between the filter 40 and the screen 44 serves to reduce the contact area between the filter 40 and the screen 44, thus improving the filtration capability of the centrifugal drum 20. The net 51, 52 further serves to facilitate smooth separation of the filter 40 from the screen 44 when the rotor 22 is removed from the basket 21.

Obviously, various modifications and variations of the present invention are possible in the light of the above teaching. It is therefore to be understood that within the scope of the appended claims the invention may be practiced otherwise than as specifically described.

What is claimed is:

1. A centrifugal separator comprising:
   (a) a rotatable centrifugal drum rotatable about an axis of rotation and including a perforated basket having an open end, and a rotor slidably received in said basket and normally closing said open end of said basket, said rotor being rotatable in unison with said basket and reciprocally movable in a direction parallel to the axis of rotation of said drum into and out of said drum through said open end of said basket;

(b) a flexible annular filter extending between said basket and said rotor to be overturned in response to the reciprocating movement of said rotor;

(c) a water-permeable tubular screen disposed between said filter and an inner peripheral surface of said basket and having an annular flange at one end thereof detachably connected to said open end of said basket, said annular flange of said screen having a first circular groove receiving therein one peripheral edge of said annular filter, said rotor including an annular end plate having a second circular groove facing away from said first circular groove in a direction away from the open end of said basket and receiving therein the other peripheral edge of said annular filter, and a pair of presser ring plates detachably connected to said annular flange and said end plate, respectively, for holding said peripheral edges of said filter in said first and second circular grooves; and (d) spacer means disposed between said screen and said basket for holding them in radially spaced relation to one another.

2. A centrifugal separator according to claim 1, said tubular screen having a number of slits extending parallel to the longitudinal axis of said tubular screen and circumferentially spaced at equal intervals.

3. A centrifugal separator according to claim 1, said spacer means comprising a plurality of ribs projecting from said inner peripheral surface of said basket.

4. A centrifugal separator according to claim 3, said ribs extending circumferencially of said basket.

5. A centrifugal separator according to claim 4, each said ribs extending continuously throughout the full circumference of said basket.

6. A centrifugal separator according to claim 1, further including an additional spacer means disposed between said filter and said screen for holding them in radially spaced relation to one another.

7. A centrifugal separator according to claim 6, said additional spacer means comprising a wire net disposed on an inner peripheral surface of said tubular screen.

8. A centrifugal separator according to claim 6, said additional spacer means comprising a fiber net united with one surface of said filter which faces said screen when said rotor is disposed in said basket.

9. A centrifugal separator of the type having a rotary perforated basket which has an open forward end and a closed rearward end, and a rotationally driven rotor normally closing the open end of the basket and rotatable in unison with the basket and being axially displaceable out of the open end of the basket; a flexible annular filter disposed between and extending along the basket and rotor and connected to be turned inside out in response to axial displacement of the rotor out of the basket open end; a water-permeable annular screen removably interposed between the filter and basket and supporting the filter thereon during rotation of the rotor, the screen having at a forward end thereof an annular flange having an annular groove therein which faces in the dirction of the basket open end and which removably receives therein a forward end portion of the filter; connecting means including an annular plate engaging the screen annular flange to cover the groove for releasably connecting both the forward end portion of the filter and the screen to the basket; and spacer means disposed between the screen and basket for maintaining the screen spaced from the basket.

10. A centrifugal separator according to claim 9; wherein the spacer means comprises means independent of the screen for maintaining the screen spaced from the basket.

11. A centrifugal separator according to claim 10; wherein the spacer means comprises a plurality of projections projecting inwardly from the basket.

12. A centrifugal separator according to claim 9; including another spacer means independent of the screen and filter and interposed therebetween for maintaining the filter spaced from the screen.

13. A centrifugal separator according to claim 12; wherein the another spacer means comprises a wire net.

14. A centrifugal separator according to claim 12; wherein the another spacer means comprises a flexible fiber net.

15. A centrifugal separator according to claim 9; wherein the rotor has an annular rear end plate having an annular groove therein in which is removably received a rearward end portion of the filter; and connecting means including an annular plate engaging the rear end plate to cover the groove for releasably connecting a rearward end portion of the filter to the rotor.

16. A centrifugal separator according to claim 15; wherein the annular groove in the rear end plate of the rotor faces in a direction away from the basket open end.

17. A centrifugal separator according to claim 9; wherein the screen comprises a one-piece integral structure.

* * * * *